United States Patent
Yoneda

[11] Patent Number: 5,158,496
[45] Date of Patent: Oct. 27, 1992

[54] TRAVELLING TOY

[75] Inventor: Yousuke Yoneda, Tokyo, Japan

[73] Assignee: Tomy Company, Ltd., Katsushika, Japan

[21] Appl. No.: 631,854

[22] Filed: Dec. 21, 1990

[30] Foreign Application Priority Data

Jan. 24, 1990 [JP] Japan .................................... 2-5486

[51] Int. Cl.5 ............................................. A63H 17/26
[52] U.S. Cl. .................................... 446/457; 446/431; 446/441
[58] Field of Search ............... 446/431, 441, 444, 445, 446/446, 465, 484, 489; 273/86 B

[56] References Cited

U.S. PATENT DOCUMENTS

| | | | |
|---|---|---|---|
| 2,537,281 | 1/1951 | Roshak | 446/431 X |
| 3,159,109 | 12/1964 | Braverman | 446/446 X |
| 3,398,480 | 8/1968 | Tsunoda | 446/441 X |
| 3,453,970 | 7/1969 | Hansen | 446/446 |
| 3,535,821 | 10/1970 | Ieda | 446/441 |
| 3,596,397 | 8/1971 | Colletti | 446/446 |
| 4,136,485 | 1/1979 | Jones et al. | 446/446 |
| 4,386,777 | 6/1983 | Prehodka | 446/444 X |
| 4,429,488 | 2/1984 | Wessels | 446/446 |
| 4,471,418 | 5/1988 | Kaiser | 446/465 X |
| 4,940,440 | 7/1990 | Russell | 446/446 |

FOREIGN PATENT DOCUMENTS

| | | |
|---|---|---|
| 258068 | 10/1940 | United Kingdom . |
| 1191109 | 5/1970 | United Kingdom . |
| 2209881 | 8/1988 | United Kingdom . |

Primary Examiner—Robert A. Hafer
Assistant Examiner—Sam Rimell
Attorney, Agent, or Firm—Staas & Halsey

[57] ABSTRACT

A travelling toy comprising a body, a DC motor mounted on the body and having a rotor, a stator, at least one commutator bar and a brush having a position of contact with the at least one commutator bar; and means for adjusting the position of contact of the at least one commutator bar and the brush relative to the stator.

4 Claims, 3 Drawing Sheets

TRAVELLING TOY

BACKGROUND OF THE INTENTION

1. Field of the Invention

The present invention relates generally to a travelling toy having a DC motor and, more particularly, to an improved travelling toy having a DC motor and brush.

2. Description of the Related Art

It is known to use a travelling toy in a racing game system with the toy carrying thereon a DC motor and brush as a simple motor. These toys are sometimes known as "slot cars".

In a racing games using such a travelling toy, the toy is allowed to travel along a circular track with power supply rails laid thereon. Players compete with each other in the time required for making a lap on laps around the track, or the toy is allowed to travel along a rectilinear track with power supply rails laid thereon and the players compete with each other in speed.

The adjustment of speed in such travelling toy is generally made by voltage control which is performed by throttle grip adjustment.

However, with only such voltage control made by throttle grip adjustment, the application to both circular and rectilinear tracks is difficult and this has been a problem. The reason is that under a load the speed of the DC motor decreases to an extreme degree and so at a curve of a high load the travelling toy slows down to an extreme degree.

Therefore, the development of a travelling toy capable of changing the motor characteristic into a high torque type or a high revolution type has heretofore been desired.

SUMMARY OF THE INVENTION

The present invention has been accomplished in view of the above-mentioned problem and it is an object thereof to provide a travelling toy having a DC motor which permits the player to enjoy a game while adjusting the motor characteristic to an optimal one according to the kind of a track used.

According to the present invention, in order to solve the above-mentioned problem, in a travelling toy having a DC motor and a brush, there is provided means for changing the position of contact between a brush and a commutator bar relative to a stator. For example, a brush holder is made rotatable relative to the stator.

The present invention intends to solve the foregoing problem on the basis of the fact that the motor characteristic can be changed between high torque type and high revolution type by changing the position of contact between a brush and a commutator bar relative to the direction of a magnetic field of a stator.

According to the above construction of the present invention, when players compete with each other in the time required to make a lap on laps along a low-speed track having many curves, the motor is changed into a high torque type by setting the position of contact between the brush and the commutator bar relative to the direction of a magnetic field of the stator to a minus-side advanced position with respect to a normal position (a maximum motor efficiency position). When the players compete with each other in the required time along a high-speed straight track, or one with few curves, the motor can be changed into a high revolution type by setting the position of contact between the brush and the commutator bar relative to the direction of a magnetic field of the stator to a plus-side advanced position with respect to the normal position.

Thus, the players can enjoy the game while adjusting the motor characteristic to an optimal one according to the kind of a track used.

It is also possible for the players to enjoy making the brush axis adjustment, as if the car was being tuned.

DETAILED DESCRIPTION OF THE PREFERRED EMBODIMENTS

A travelling toy according to an embodiment of the present invention will be described below with reference to the drawings.

Figure 1:
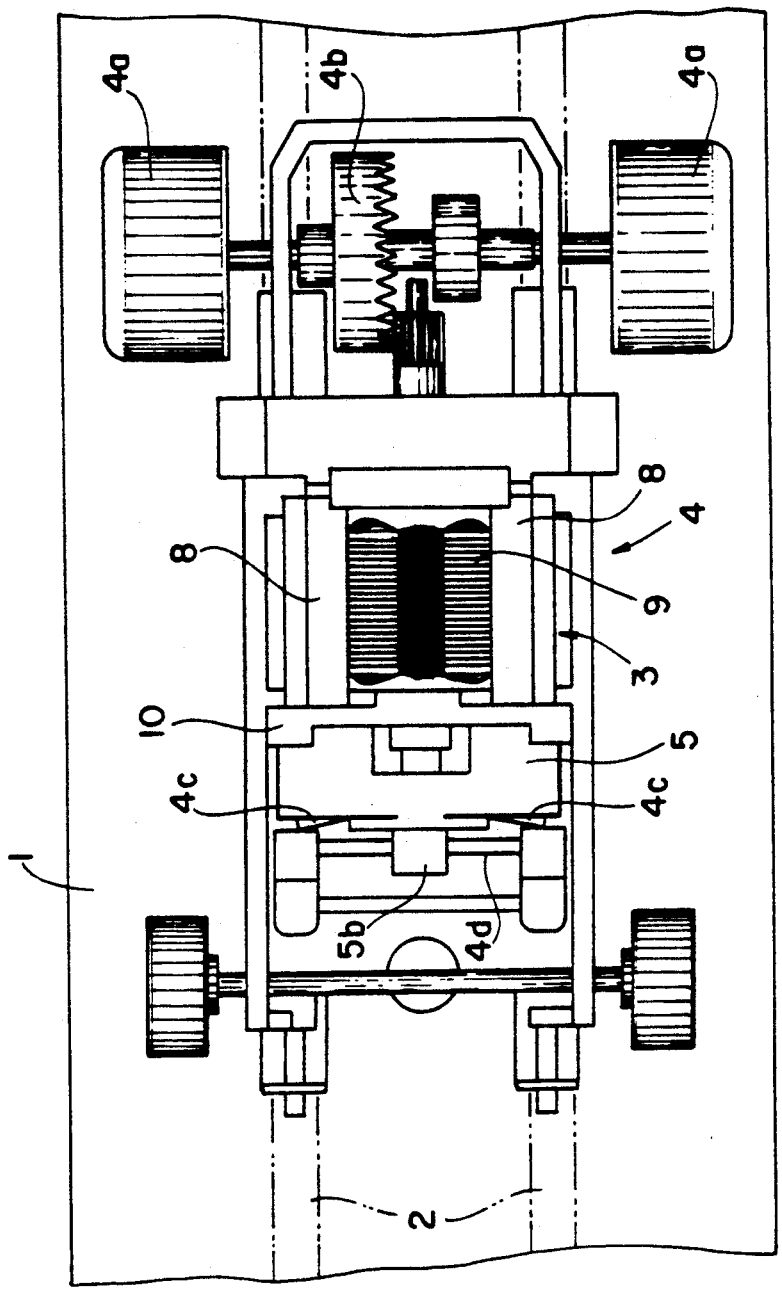
FIG. 1 is a plan view showing the construction of a travelling toy according to a preferred embodiment of the present invention.
Figure 2:
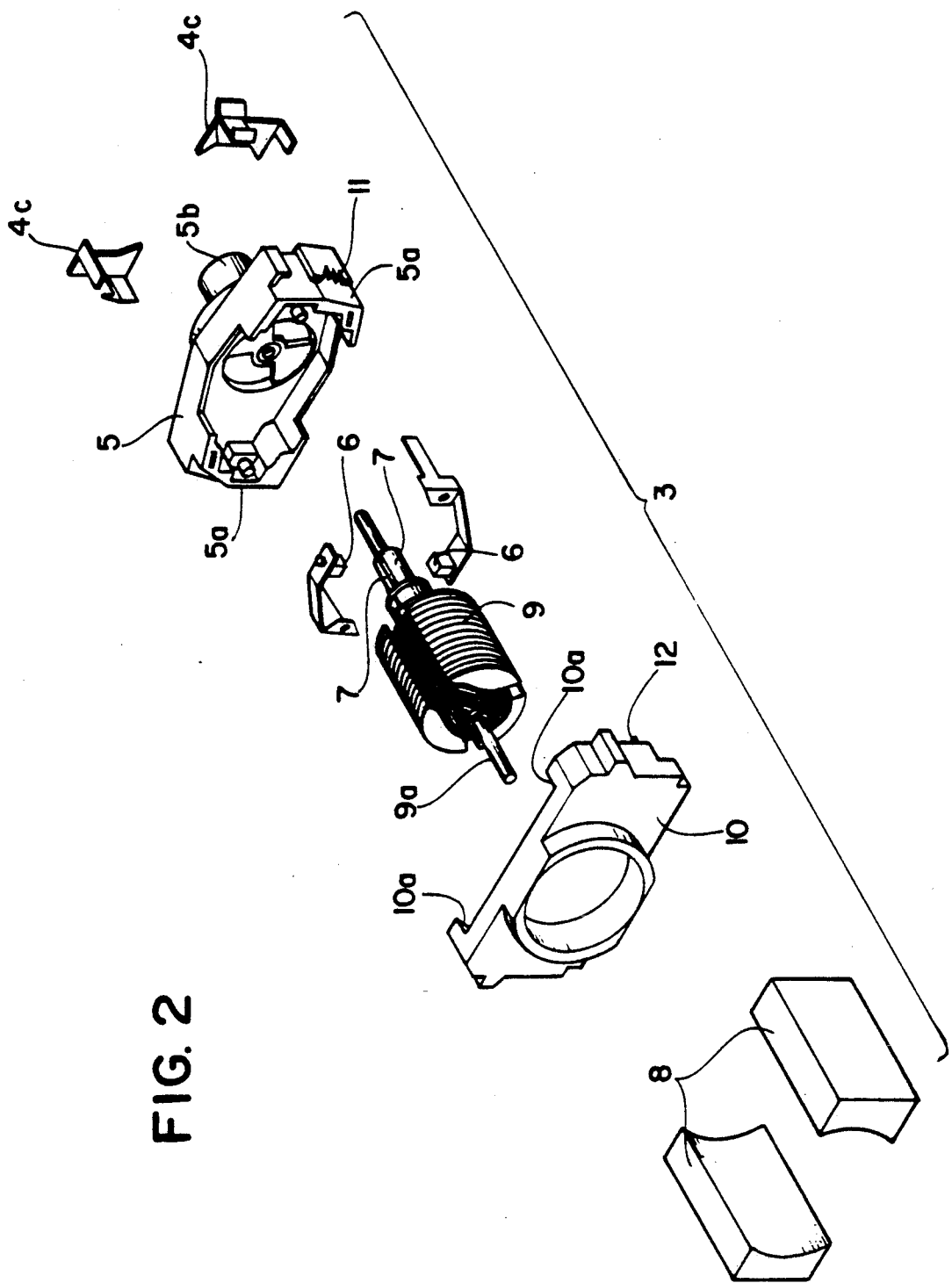
FIG. 2 is an exploded perspective view of a motor used in the travelling toy of FIG. 1.

In the travelling toy according to an embodiment of the invention illustrated in FIGS. 1 and 2, wheels 4a of a travelling body 4 are driven by a DC motor 3 which is carried by the body 4 and supplied with direct current from power supply rails 2 laid on a travelling track 1. Rotation of the wheels due to torque of the motor 3, while frictionally engaging the track 1, causes the toy 1 to travel on the track.

This process will now be explained in greater detail as follows. The direct current fed from the power supply rails 2 to the motor 3 is transmitted through terminal strips 4c to brushes 6 which are connected to the terminal strips 4c, and then flows through three commutator bars 7 into the winding of a rotor 9 placed in the magnetic field of a stator 8. The rotor 9 is rotated in accordance with the Fleming's left-hand rule. Further, the driving force of the rotor 9 is transferred to the rear wheels 4a through a gear mechanism 4b, whereby the wheels 4a are rotated and hence the travelling body 4 is allowed to travel.

In the motor 3 of the travelling toy of this embodiment, end portions 5a of a brush holder 5 are fitted in recesses 10a of a brush holder supporting case 10 so as to be slidable about a rotary shaft 9a of the rotor 9, the brush holder supporting case 10 being fixedly connected to the travelling body 4.

In each side face of the brush holder 5 there is formed a knurl 11 for adjustment. When the brush holder 5 slides about the rotary shaft of the rotor 9 as it is fitted in the brush holder supporting case 10, the adjusting knurl 11 comes into mesh with a lug 12 formed at an end portion of the brush holder supporting case 10, whereby the brush holder is positioned to a predetermined position in the brush holder supporting case 10.

More specifically, the adjusting knurl 11 is formed with a plurality of closely spaced, shallow teeth. By changing the position of engagement between the adjusting knurl 11 and the lug 12 the position of the brush holder 5 can be stepwise adjusted and fixed between a position (normal position) shown in FIG. 3(b) corresponding to a maximum motor efficiency, and a high torque position (a minus-side advanced position with respect to the normal position) shown in FIG. 3(a), and conversely between the position corresponding to the maximum motor efficiency shown in FIG. 3(b) and a high revolution position (a plus-side advanced position with respect to the normal position) shown in FIG. 3(c).

Figure 3A:
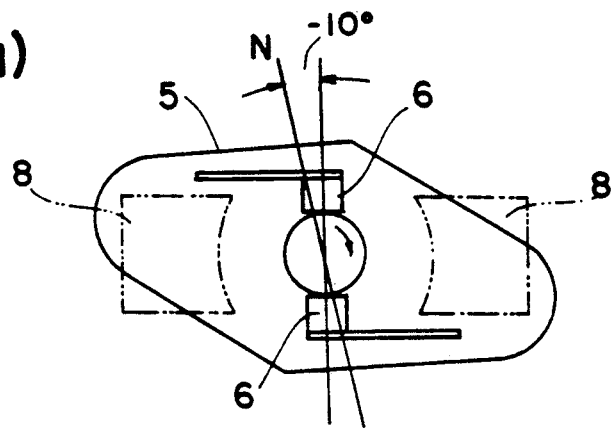
FIG. 3(a) is a view showing a brush-commutator bar contacted state in a minus-side advanced position as seen from behind the travelling toy.
Figure 3B:
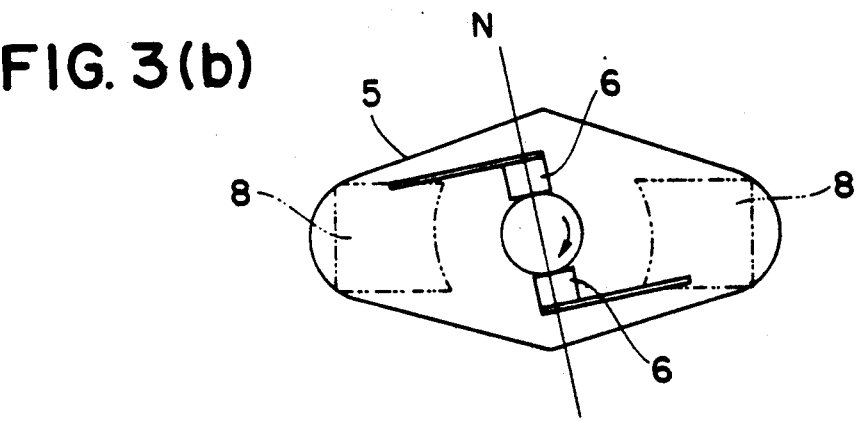
FIG. 3(b) is a view showing a brush-commutator bar contacted state in the normal position as seen from behind the travelling toy.

The position corresponding to the maximum motor efficiency shown in FIG. 3(b) is a position suitable for a medium speed track having an average curve-line combination. In the above embodiment, a line joining upper and lower vertexes of the brush holder 5 and a vertical axis coincide with each other in this brush position, and this position serves as the normal position.

As the maximum torque position shown in FIG. 3(a), in the case of three commutator bars 7, there is selected a position (a minus-side advanced position) in which the brush-commutator bar contact is delayed 10 degrees with respect to the normal position N shown in FIG. 3(b).

Figure 3C:
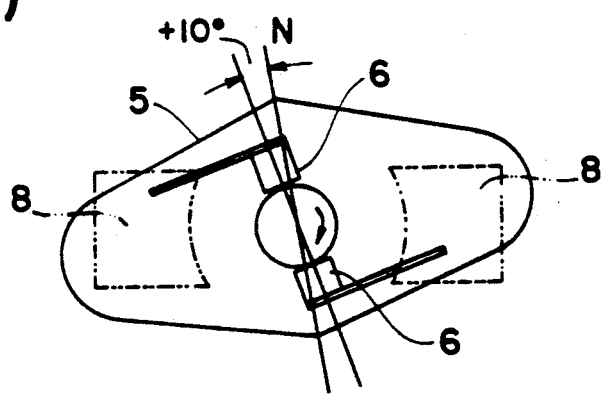
FIG. 3(c) is a view showing a brush-commutator bar contacted state in a plus-side advanced position as seen from behind the travelling toy.

On the other hand, as the maximum revolution position shown in FIG. 3(c), in the case of three commutator bars 7, there is selected a position (a plus-side advanced position) in which the brush-commutator bar contact is advanced 10 degrees in the rotating direction of the rotor 9 with respect to the normal position N shown in FIG. 3(b).

The motor characteristic can be changed stepwise according to the kind of track by rotating the brush holder 5 between the normal position shown in FIG. 3(b) and the maximum revolution position shown in FIG. 3(c).

In the travelling toy of this embodiment constructed as above there can be attained the following effect.

In the case of a medium speed track corresponding to an average curve-line combination, the motor 3 can be adjusted into a medium torque, medium revolution type by setting the position of the brush holder 5 to the position shown in FIG. 3(b). In the case of a low speed track including many curves, the motor 3 can be adjusted into a high torque type by setting the position of the brush holder 5 to the minus-side advanced position shown in FIG. 3(c) with respect to the normal position N to delay the NS changeover timing of the rotor 9. On the other hand, in the case of a high speed track with few curves, the motor 3 can be adjusted into a high revolution type by setting the position of the brush holders 5 to a plus-side advanced position shown in FIG. 3(a) to quicken the NS change-over timing of the rotor 9. Thus, the player can enjoy the game while adjusting the characteristic of the motor 3 into an optimal type according to the kind of a track used.

Although an embodiment of the present invention has been described above, it goes without saying that the present invention is not limited thereto and that various modifications may be made within the scope of the invention set forth in the claims.

For example, although in the above embodiment the position of contact between the brush 6 and the commutator bar 7 is changed stepwise, it may be changed in a stepless manner, by simply turning the brush holder by hand, with the angle of adjustment being variable between positive and negative extremes corresponding to 10° in either direction. The adjusted position can be maintained by frictional fit between an outer surface of a shaft bearing 5b of the brush holder 5 and a trunnion 4d of the body 4.

Although in the above embodiment the position of contact between the brush 6 and the commutator bar 7 is changed by rotating the brush holder, the stator side may be rotated, or only the brush 6 may be moved without rotation of the brush holder 5, if only the position of contact between the brush 6 and the commutator bar 7 can be changed.

Further, although in the above embodiment the number of commutator bars 7 is three, there may be used four or more commutator bars 7.

In the travelling toy having a DC motor with brush according to the present invention, as set forth above, since there is provided means for changing the brush-commutator bar contact position relative to the stator, in the case where players compete with each other in the time required to make a lap or laps along a low speed track including many curves, the motor can be adjusted into a high torque type by setting the brush-commutator bar contact position relative to the direction of a magnetic field of the stator to a minus-side advanced position with respect to the normal position, while in the case where players compete with each other in the time required to make a lap or laps along a high speed track with few curves, the motor can be adjusted into a high revolution type by setting brush-commutator bar contact position relative to the magnetic field direction of the stator to a plus-side advanced position with respect to the normal position.

Therefore, according to the present invention there can be provided a travelling toy having a DC motor which permits the player to enjoy a game while adjusting the motor characteristic to an optimal one according to the kind of game.

What is claimed is:

1. A toy vehicle, comprising:
   a body;
   at least one wheel mounted for movement with respect to said body to propel the vehicle;
   a DC motor mounted within said body and having a stator, a rotor and at least one commutator bar associated therewith; and
   a brush holder supporting case mounted to said body, a brush holder mounted for movement with respect to said supporting case, and at least one brush associated with said supporting case and holder, such that the position of said brush holder and said brush relative to said supporting case can be changed to vary the position of contact between said brush and said commutator bar relative to said stator to change the characteristics of the motor between high torque and high revolution.

2. A toy vehicle as in claim 1, wherein:
   said brush holder is provided with an adjustable knurl, and wherein said brush holder supporting case is provided with a lug such that the position of engagement between said knurl and said lug can be varied.

3. A toy vehicle as in claim 1, wherein:
   said rotor includes an output shaft, a drive axle operatively connected to said rotary shaft, said wheel mounted to said drive axle, and wherein said commutator bar is disposed on said output shaft.

4. A toy vehicle as in claim 1, wherein:
   the variation in the position of contact between said brush and said commutator bar relative to said stator is in the range of angular movement from −10° and +10°.

* * * * *

UNITED STATES PATENT AND TRADEMARK OFFICE
CERTIFICATE OF CORRECTION

PATENT NO. : 5,158,496
DATED : October 27, 1992
INVENTOR(S) : Yousuke Yoneda

It is certified that error appears in the above-identified patent and that said Letters Patent is hereby corrected as shown below:

```
Column 1, line 1, change "BACKGROUND OF THE INTENTION"
                 to --BACKGROUND OF THE INVENTION--.
Column 4, line 62, after "rotary" insert --output--.
          line 69, "and" should be --to--.
```

Signed and Sealed this

Fifth Day of October, 1993

Attest:

Attesting Officer

BRUCE LEHMAN

Commissioner of Patents and Trademarks